(12) United States Patent
Khare et al.

(10) Patent No.: US 6,859,864 B2
(45) Date of Patent: Feb. 22, 2005

(54) MECHANISM FOR INITIATING AN IMPLICIT WRITE-BACK IN RESPONSE TO A READ OR SNOOP OF A MODIFIED CACHE LINE

(75) Inventors: Manoj Khare, Saratoga, CA (US); Lily P. Looi, Portland, OR (US); Akhilesh Kumar, Sunnyvale, CA (US); Kenneth C. Creta, Gig Harbor, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/752,576

(22) Filed: Dec. 29, 2000

(65) Prior Publication Data

US 2003/0131202 A1 Jul. 10, 2003

(51) Int. Cl.$^7$ .............................................. G06F 12/00
(52) U.S. Cl. ........................ 711/146; 711/121; 711/141
(58) Field of Search ............................... 711/141, 142, 711/143, 144, 145, 146, 147

(56) References Cited

U.S. PATENT DOCUMENTS

| | | | |
|---|---|---|---|
| 5,222,224 A | * 6/1993 | Flynn et al. | 711/144 |
| 5,737,568 A | * 4/1998 | Hamaguchi et al. | 711/121 |
| 6,088,769 A | * 7/2000 | Luick et al. | 711/141 |

OTHER PUBLICATIONS

James Archibald and Jean–Loup Baer, Cache Coherence Protocols: EvaluationUsing a Multiprocessor Simulation Model, ACM Transactions on Computer Systems, Nov. 1986, vol. 4, No. 4, pp. 273–298.*

James Archibald and Jean–Loup Baer, An Economical Solution to the Cache Coherence Problem, IEEE, 1984, pp. 355–362.*

Paruvachi V. Raja and Subramaniam Ganesan, A Hardware Cache Coherency Scheme For Multiprocessors, IEEE, 1993, pp. 181–184.*

* cited by examiner

Primary Examiner—Mano Padmanabhan
Assistant Examiner—Thang H Ho
(74) Attorney, Agent, or Firm—Libby H. Hope (57) ABSTRACT

A method and apparatus are described for providing an implicit write-back in a distributed shared memory environment implementing a snoop based architecture. A requesting node submits a single read request to a snoop based architecture controller switch. The switch recognizes that another node other than the requesting node and the home node for the desired data has a copy of the data. The switch directs the request to the responding node that is not the home node. The responding node, having modified the data, provides a single response back to the switch that causes the switch to both update the data at the home node and answer the requesting node. The updating of the data at the home node is done without receiving an explicit write instruction from the requesting node.

19 Claims, 8 Drawing Sheets

| | REQUEST | IA64 | IA32 | IOH | ROUTE [1:0] |
|---|---|---|---|---|---|
| 10 | PRLC/PRLD | PSNRM | PSNRMS | PSNRM | 11 |
| 20 | PSIL | PSNRM | PSNRM | PSNRM | 11 |
| 30 | PSILND | PSNRM | PSNRM | PSNRM | 10 |
| 40 | PSFCL | PSNRM | PSNRM | PSNRM | 10 |

MECHANISM FOR INITIATING AN IMPLICIT WRITE-BACK IN RESPONSE TO A READ OR SNOOP OF A MODIFIED CACHE LINE

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND OF THE INVENTION

1. Field of the Invention

The invention relates generally to the field of shared memory multiprocessor architectures. More particularly, the invention relates to providing an implicit write-back mechanism for updating a home memory without waiting for a write command from the requesting node.

2. Description of the Related Art

In the area of distributed computing when multiple processing nodes access each other's memory, the necessity for memory coherency is evident. Various methods have evolved to address the difficulties associated with shared memory environments. One such method involves a distributed architecture in which each node on the distributed architecture incorporates a resident coherence manager. Because of the complexity involved in providing support for various protocol implementations of corresponding architectures, existing shared memory multiprocessing architectures fail to support the full range of Modified, Exclusive, Shared and Invalid (MESI) protocol possibilities. Instead, existing shared memory multiprocessor architectures rely on assumptions so as to provide a workable although incomplete system to address these various architectures. One of the fundamental flaws of these existing memory sharing architectures is that a responding node, containing modified data for a cache line where the home storage location for the memory in question resides on a different node, is expected only to provide a passive response to a read request. No mechanism is built into the architectures to provide intelligent handling of read requests. This limitation requires the requesting node to issue a separate write command to the home node to update the memory corresponding to the modified data received from the responding node causing unnecessary delay and increased resource usage.

Figure 8:
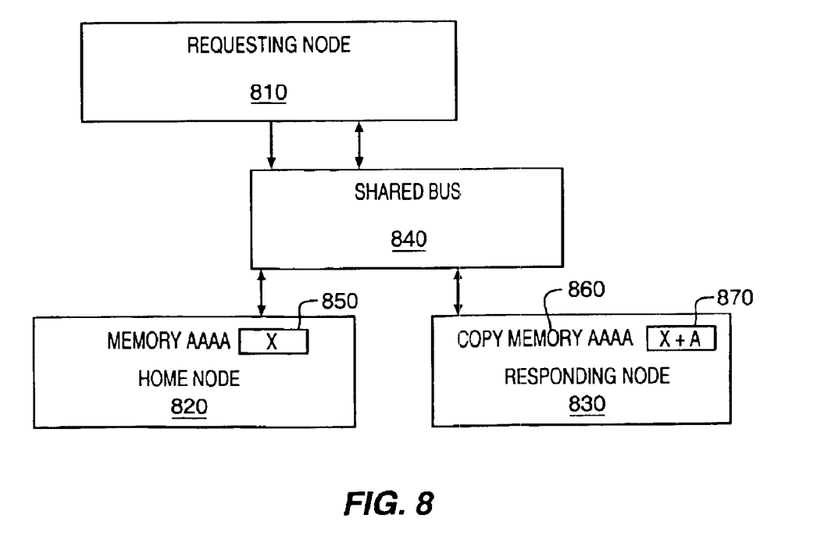
FIGS. 8–9 illustrate an example of a conventional method for updating a home memory.
Figure 9:
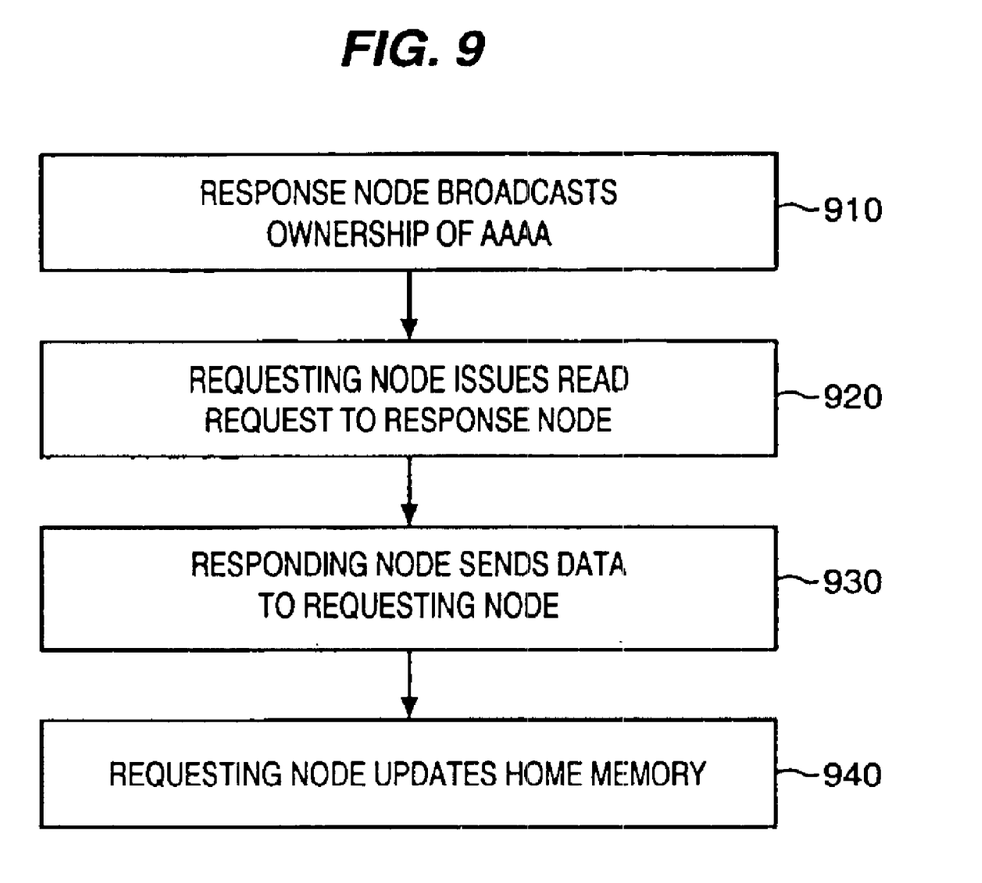

FIGS. 8–9 demonstrate an example of one such existing architecture. The shared memory environment has three nodes 810, 820 and 830 and a shared bus 840 between the nodes. Although each node contains similar elements and functionality necessary to be part of shared memory environment such as a memory and a local coherence controller (not shown), the nodes have been conveniently labeled as requesting node 810, home node 820 and responding node 830 in order to demonstrate an illustrative example of the architecture. In this architecture, each node that currently has control of a cache line broadcasts its ownership to the other participating nodes. At step 910, the responding node broadcasts that it currently has ownership (i.e., a copy) of Memory AAAA 850 that resides on home node. At some later time, in step 920, the requesting node 810 issues a read request for memory AAAA 850 that is directed to the responding node 830 that last broadcast its ownership of the cache line concerning the copy of the desired memory address 860. However, the current responding node is not the home node for memory AAAA contained on the cache line and has since modified the contents of the copy 860 since broadcasting its ownership of the cache line. At step 930, the responding node 830 responds to the requesting node by submitting the updated data contents 870 to the requesting node 810 and its state changes from Modified to some other state. In order to provide coherent data in the home memory, the requesting node 810 must then submit a write request 940 to the home node 820 to update the home memory 850 and broadcast that it now has control of the cache line.

In addition to not being extensible, this architecture requires constant surveillance by each node coherence manager at all of the participating nodes, utilizes extensive resources and requires the requesting node to direct all elements of a transaction including gaining control of the appropriate cache line and issuing appropriate requests to maintain coherency.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

A method and apparatus are described for providing an implicit writeback in response to receiving a read or snoop request from a requesting node when the responding node is not the home node of the data associated with the cache line that is being targeted.

In the following description, for the purposes of explanation, numerous specific details are set forth in order to provide a thorough understanding of the present invention. However, the present invention may be practiced without some of the specific detail provided therein. The invention is described herein primarily in terms of a requesting node initiating a read or snoop request of a modified cache line in a distributed shared memory environment. The cache line is accessible by a requesting node, a home node that maintains permanent storage of the cache line memory and a responding node that may have a copy of the cache that has been altered since retrieval from the home node. The read or snoop request is sent to the responding node containing the potentially altered copy of the memory. If the cache memory of interest has been altered, the responding node, in this case the receiving node containing the altered copy of the memory, indicates what state it will transition to and initiates an implicit write-back to update the permanently stored memory on the home node while also directing the data to the requesting node. After the home node updates the memory, a completion response is sent to the requesting node, completing the read request transaction.

The invention, however, is not limited to this particular embodiment alone, nor is it limited to use in conjunction with any particular distributed shared memory environment. For example, the claimed method and apparatus may be used in conjunction with various system architectures. It is contemplated that certain embodiments may be utilized wherein a request is received by a responding node and the responding node initiates the implicit write-back to the home node in response to the read request while also providing the altered data to the requesting node.

The present invention includes various operations that will be described below. The operations of the present invention may be performed by hardware components or may be embodied in machine-executable instructions, which may be used to cause a general-purpose or special-purpose processor or logic circuits programmed with the instructions to perform the steps. Alternatively, the steps may be performed by a combination of hardware and software.

The present invention may be provided as a computer program product, which may include a machine-readable medium having stored thereon instructions, which may be used to program a computer or other electronic devices to perform a process according to the present invention. The machine-readable medium may include, but is not limited to, floppy diskettes, optical disks, CD-ROMs, magneto-optical disks, ROMs, RAMs, EPROMs, EEPROMs, magnetic or optical cards, flash memory, or other type of media/machine-readable medium suitable for storing electronic instructions. Moreover, the present invention may also be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, herein, a carrier wave shall be regarded as comprising a machine-readable medium.

Terminology

Brief initial definitions of terms used throughout this application are given below to provide a common reference point.

A home node is a node where the contents of a cache line are permanently stored.

A responding node is a node that has a copy of the contents of the cache line in question and is responding to a read request for the most recent copy of the contents.

A requesting node is a node that initiates a read request for contents of a particular cache line or memory.

An implicit write-back is a response by a responding node to a read or snoop request directed to a modified cache line that automatically updates the memory in question on the home node.

Exemplary Operating Environment

Figure 1:
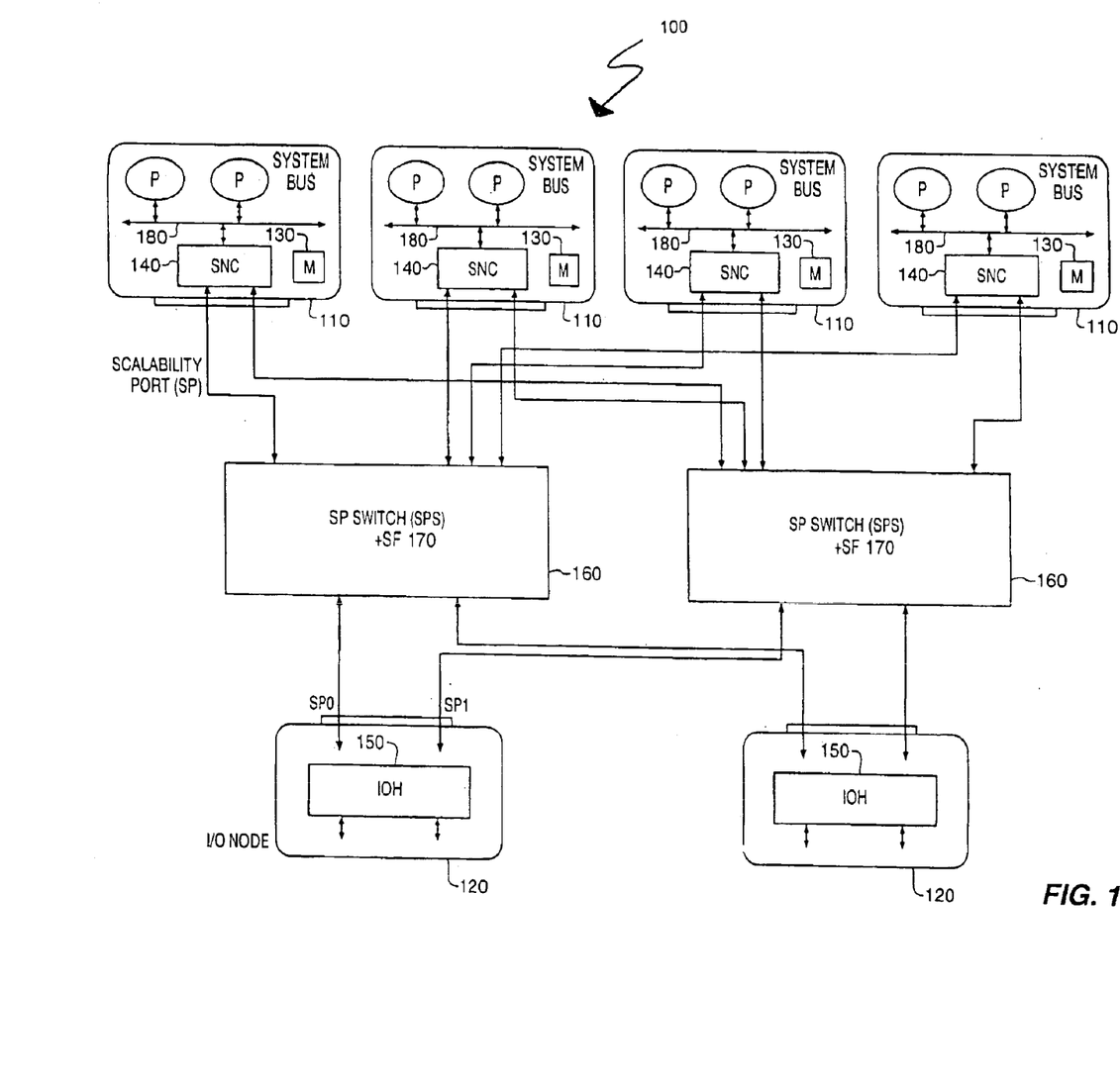
FIG. 1 illustrates an environment suitable for an implicit write-back mechanism to be implemented.

FIG. 1 illustrates an exemplary operating environment 100 according to one embodiment of the invention. In this example, multiple nodes 110 and 120 share memory through a cache based coherence system. The nodes supported are processor nodes 110 each having a local memory 130 and Input/Output (IO) nodes 120. The cache based coherence system is collectively designated the Scalability Port (SP). In node environments with more than two nodes the SP includes a System Node Controller (SNC) chip 140 in each of the processor nodes 110 and an IO Hub (IOH) 150 chip in each of the IO nodes 120. The IO node implements a cache, such as an L2 cache, so that it may participate in cache coherency. In addition to the SNC 140 and the IOH 150, the SP provides central control for its snoop architecture in a Scalability Port Switch (SPS) 160 that includes a snoop filter (SF) 170 to track the state of cache lines in all the caching nodes. The SNC 140 interfaces with the processor bus 180 and the memory 130 on the processor node 110 and communicates cache line information to the SPS 160 when the line is snooped for its current status. Similarly, the IOH interfaces with the IO Bus and communicates information to the SPS 160 when a line is snooped for its current status.

The SP used to exemplify the invention supports various architectures. For instance, the processor nodes 110 could be based on either the IA32 or IA64 architecture. Unlike prior snoop based cache coherence architectures, the SP supports the full MESI (Modified, Exclusive, Shared and Invalid) protocol as uniquely implemented by both architectures, the IA32 coherence protocol as well as the IA64 coherence protocol. One example of how these coherence protocols differ is when the cache line is in a Modified state when a read request is initiated. In the IA32 coherence protocol, once the read request is processed, the state of the cache line transitions from Modified to an Invalid state whereas in the IA64 coherence protocol, the cache line, once read, transitions from a Modified state to a Shared state. The support of multiple architectures allows for scalability and versatility in the future development of architectures and their corresponding protocols by allowing for the resident component of the SP, i.e, the SNC for the processor node and the IOH for the IO Node, to be implemented to handle the new architecture and its corresponding protocol without having to redesign the central snoop controller, the SPS.

For simplicity, the following description utilizes several processing nodes because the IO nodes function in a similar manner with regard to the invention. The Snoop Filter in the SPS is organized as a tag cache that keeps information about the state of each cache line and a bit vector indicating the presence of the cache line at the various caching nodes. An illustration of the information maintained in the Snoop Filter 200 is demonstrated abstractly in FIG. 2. The contents of memory location AAAA 210, maintained exclusively on the Home Node 220, are copied and accessible in a cache 230 on the responding node 240. The responding node SNC (or IOH) 250 maintains a local presence vector 260 and status 270 for each cache line it utilizes, a snoop to the SNC of node 240 may result in the Snoop Filter's presence vector and status being updated. The bit vector, called the presence vector, has one bit per caching node in the system. If a caching agent at any node has a copy of the cache line, the corresponding bit in the presence vector for that cache line is set. A cache line could be in the Invalid, Shared, or Exclusive state in the Snoop Filter. In this case, the home node's cache line is in a Shared state (S), while the requesting node's cache line is in an Invalid state (I) and the responding node's cache line was last known to be in an Exclusive state (E). According to the described embodiment, the cache line in the Snoop Filter will not indicate that a line is in a Modified state, because a read to a Modified line will result in the Modified line changing states in response to a snoop or read inquiry.

The Snoop Filter is inclusive in that it does not contain the cache data, but only tracks the tag and the state of caches at all the caching agents. It is possible to divide the Snoop Filter into multiple Scalability Port Switches or into multiple caches within one SPS to provide sufficient Snoop Filter throughput and capacity to meet the system scalability requirement. In such cases, different snoop Filters keep track of mutually exclusive sets of cache lines. A cache line is tracked at all times by only one Snoop Filter.

The state of a cache line in the Snoop Filter is not always the same as the state in the caching agent's SNC. Because of the distributed nature of the system, the state transitions at the caching agents and at the Snoop Filter are not always synchronized. In fact, some of the state transitions at the caching agents are not externally visible and therefore it is not possible to update the Snoop Filter with such transactions. For example, transitions from an Exclusive state to a Modified state may not be visible external to the caching agent. Although other ambiguous situations may exist, the usefulness of the invention is illustrated by the scenario in FIG. 2 when a cache line is in the Exclusive state at the Snoop Filter. In this case, the Snoop Filter is aware only that the caching agent, i.e. the responding node 240, has exclusive access to the cache line as indicated by the presence vector. However, the state of the cache line at the caching agent may have changed to any of the other MESI states (e.g., Modified, Shared or Invalid). If a read request is made to the SPS 290 for a cache line where ambiguity may exist, the SPS snoops the cache line, in this case the responding node's cache line, indicated by the presence vector to get its current state and most recent corresponding data if necessitated.

Figure 2:
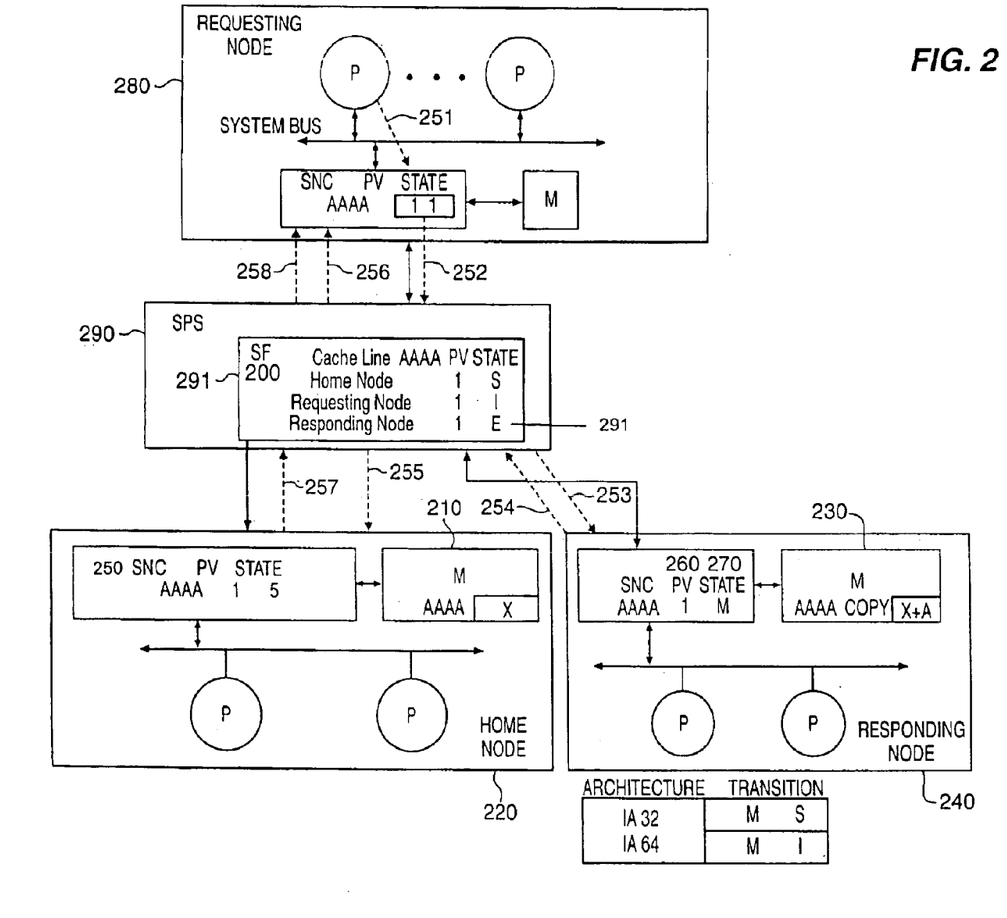
FIG. 2 demonstrates an example of how an implicit-write-back looks within a more detailed view of the environment.
Figure 3:
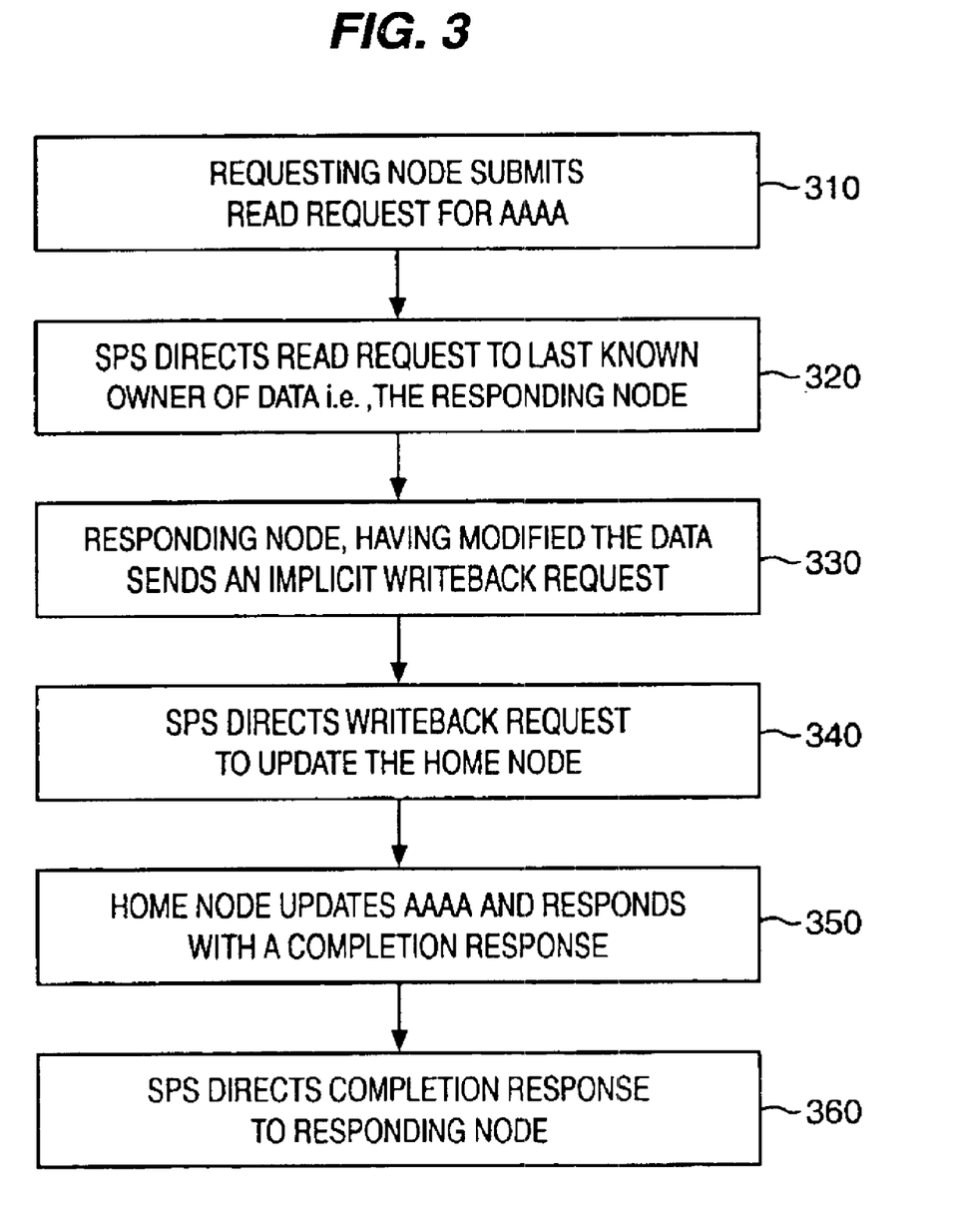
FIGS. 3–5 illustrates several flow charts for how a read-request produces an implicit write-back.
Figure 4:
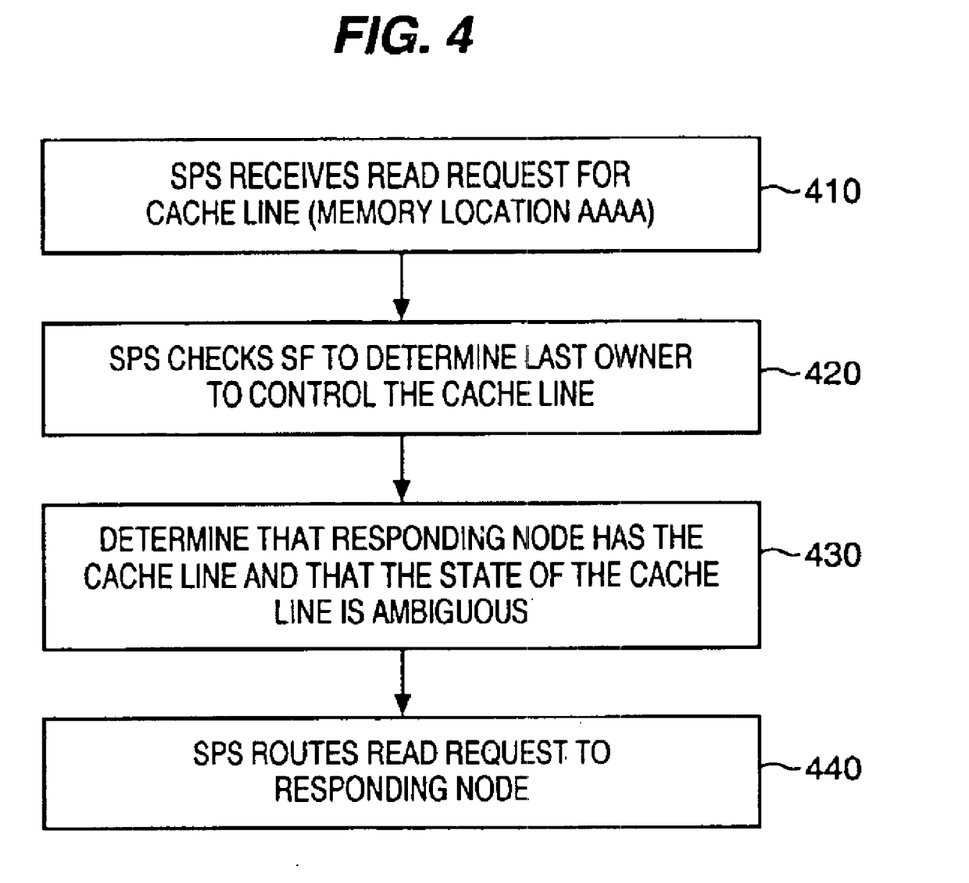
Figure 5:
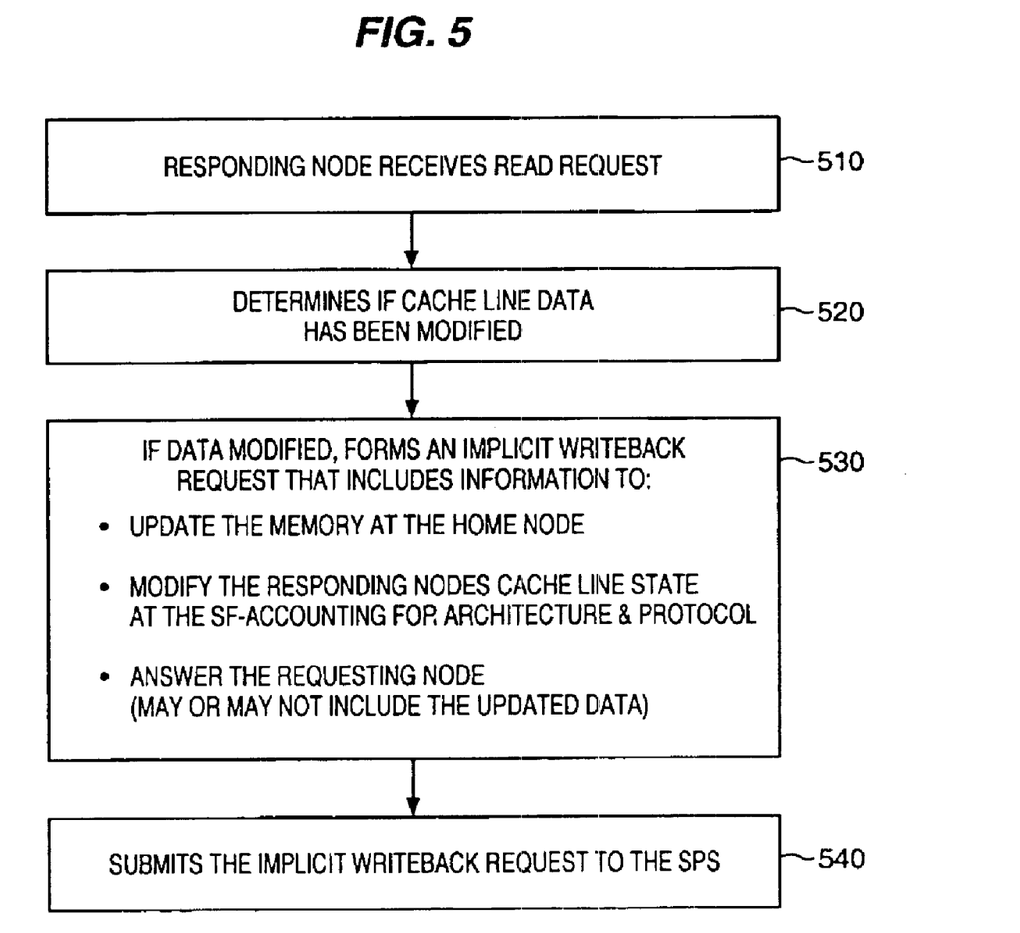

FIGS. 3, 4, and 5 illustrate what happens in the example illustrated in FIG. 2 where an ambiguity between the SF and the cache agent exists. In this example, the requesting node 280 is the node making the read request for the most current updated contents of memory location AAAA. The home node 220 is the node where the data is stored for memory location AAAA 210 and the responding node 240 is the node that currently has a modified copy of the data for memory location AAAA 230. When the responding node 240 originally acquired its copy of the data for memory location AAAA 230, the Snoop Filter 200 indicated that the responding node 240 had a copy by asserting its presence bit vector and additionally indicated that the responding node 240 was taking the copy in an Exclusive State 291. Once the Snoop Filter identifies that the data resides on the responding node, it need not monitor the activity at the responding node until another request is made. In this case, the responding node modified the data from X to X+A on the cache line and consequently its local cache line state changed to Modified 270.

FIG. 3 demonstrates the sequence of events producing an implicit write-back response by the responding node. In step 310, the requesting node submits a read request for the contents associated with memory location AAAA. At step 320, the SPS 290 directs the read request to last known owner of the data, or the responding node. In step 330, the responding node receives the request and generates both an answer to the read request and an implicit write-back. According to one embodiment, both the answer and the implicit write-back are contained in a single response by the responding node. In Step 340, the SPS directs a write to the home node and an answer to the requesting node. The home node, in step 350, updates memory location AAAA with the modified contents and generates a completion response. In step 360, the SPS directs the completion response generated by the home node to the Requesting Node. When the completion response has been received the entire transaction is completed.

FIG. 4 demonstrates how the SPS determines where to direct the read request. In step 410, the SPS receives a read request from the requesting node for memory location AAAA. The SPS then checks the SF presence vector table, in step 420, to see which node has the last copy of the cache line concerning memory location AAAA. In step 430, the SPS identifies that the Responding Node has a copy of the data and that its last known state was Exclusive. However, because the Exclusive state is a known ambiguous state at the Snoop Filter level, the SPS, in step 440 snoops the Responding Node by directing the read request to the responding node to identify the current status of the cache line so that it may properly address the read request from the requesting node.

FIG. 5 demonstrates how the responding node responds to the read request routed to it by the SPS from the requesting node. At step 510, the responding node receives the read request from the SPS. Because the Responding Node is aware that it is not the home node for this cache line and knows that the cache line state is now changing to either a Shared or Invalid state in reaction to the read request depending on whether it is implementing the IA32 or IA64 coherence protocol, it identifies what state it will transition to as well as information indicating to the SPS which, if any or both, of the requesting and home nodes need to receive updated data. At step 520, the responding node determines if its copy of the cache line AAAA has been modified. In step 530, an implicit write-back is initiated by the responding node in response to the read request by generating a command instructing the SPS to update the data at the home node. As indicated above, the implicit write-back and an answer to the read request may be communicated together in a single response. The answer to the requesting node may or may not include the modified data depending on the type of request made by the requesting node. The implicit write-back is then performed by the SPS by causing the home node to update memory location AAAA with the modified data. By performing an implicit write-back, a foundation is laid for the requesting node to assert exclusive control of the cache line so it may perform local modifications. After the home node performs the data update, a completion response is provided to the SPS that in turn is provided to the requesting node as demonstrated previously in steps 340, 350 and 360. Advantageously, this novel implicit write-back mechanism eliminates the additional time and resource burden at the requesting node as the responding node provides the information to accomplish the data update at the home node and the SPS need not wait for a write request from the requesting node.

Referring back to FIG. 2, the dashed arrows demonstrate the steps as discussed above according to one embodiment of the present invention concerning a read request and the resulting implicit write-back. At arrow 251, a processor on the requesting node submits a snoop request (i.e., a Port Snoop Line Data [PSLD] request) for Memory AAAA that resides on the home node. The request is transmitted 252 through the SNC on the Requesting Node to the SPS responsible for managing memory location AAAA and the Home Node. The SPS, by utilizing the Snoop Filter, identifies that the cache line for Memory AAAA was last in an Exclusive state on the responding node by examining the cache line's presence vector and corresponding status. Knowing that the Exclusive state is an ambiguous state, the SPS passes 253 the requesting node's PSLD request to the responding node. If the responding node is still in an Exclusive state, it will indicate its state and the SPS will tell the requesting node to retry later. If, on the other hand, the cache line is in a Modified state, the responding node sends 254 a Port Snoop Node Response (PSNR), an indication of what state the cache line at the dirty node is transitioning to so the snoop filter may update its presence vector, and a command informing the SPS to both provide the data to the requesting node and to perform an update by providing the data to the home node. This updating of the home node in response to a read or snoop request directed to a modified cache line is referred to as an implicit write-back. The SPS updates its Snoop Filter with the new status of the cache line at the responding node and substantially simultaneously provides 255 the modified data to the home node and provides 256 the response from the responding node that may include the modified data to the requesting node. When the Home Node has successfully updated Memory AAAA, it sends a completion response 257 to the SPS that routes the completion response in step 258 to the requesting node and completes the transaction.

Figure 6:
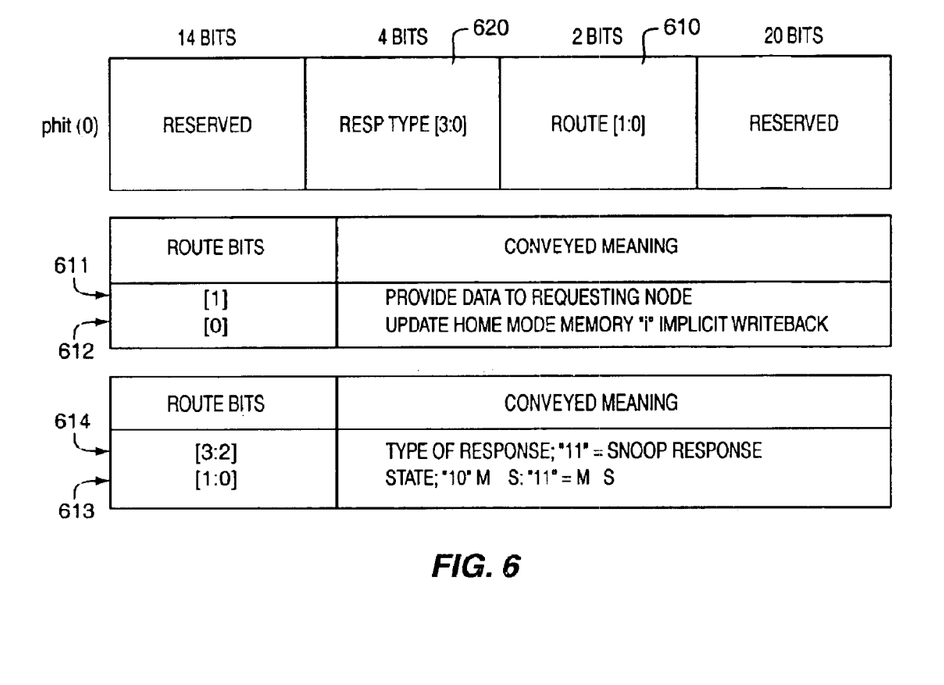
FIG. 6 illustrates an response instruction bit sequence and the placement of certain bits in the embodiment that would result in an implicit write-back.

In the Scalability Port exemplified, the response packet (e.g., the PSNR) contains information necessary to accomplish the implicit write-back. FIG. 6 illustrates information that may be communicated during physical transfers according to one embodiment of the present invention. In this example, each 40 bits communicated is considered a physical unit (PHIT). Phit(0) of the response packet includes information concerning the type of response (Resp Type) that is being communicated, the state of the cache line snooped and information concerning where the data is to be routed. Although various information is provided in the information bits such as destination node and data length, of significance for this invention are the Route bits Phit[0].Info [17:16] 610 and the Response Type bits Phit[0].Info[21:18] 620.

The Route bits indicate whether the information is to be routed to the home node or the requesting node or both. The least significant bit 612 in this field, Route [0] or Info [16], indicates whether the data is to be routed to the requesting node or not. If it is to be routed to the requesting node, then the bit is asserted. The most significant bit 611 in this field, Route [1] or Info [17], indicates whether the home memory needs to be updated or not. When Route [1] is asserted, an implicit writeback occurs and the home node memory is updated.

The most significant bits 613 of the Response Type bits indicate whether the response is a snoop response. If both RespType[3:2] bits are asserted, the response is a snoop response and the least significant bits 614 RespType[1:0] indicate the state of the cache line. If the response is a snoop response, two of the possible four states are Modified transitioning to Invalid (PSNRM) and Modified transitioning to Shared (PSNRMS). If an incoming request is a port snoop line data (PSLD) request, A PSNRM response "1110" indicates that the architecture of the responding node is implementing the IA32 coherence protocol while a PSNRMS response "1111" indicates that the architecture of the responding node is implementing the IA64 coherence protocol. The SPS is indifferent to the type of coherence protocol implemented at the responding node because it simply modifies its Snoop Filter to reflect the current status of the corresponding cache line as instructed by the SNC of the responding node.

In some instances, the responding node may be trying to send an outgoing write request at the same time it is receiving a snoop or read request from the SPS concerning the same cache line. Although the update may be included in the response to the incoming request, the home node is updated by way of an explicit write-back because the responding node was already in the process of updating the home node's memory location and was not implicitly generating a write-back to the home node in response to a read or snoop request.

Figure 7:
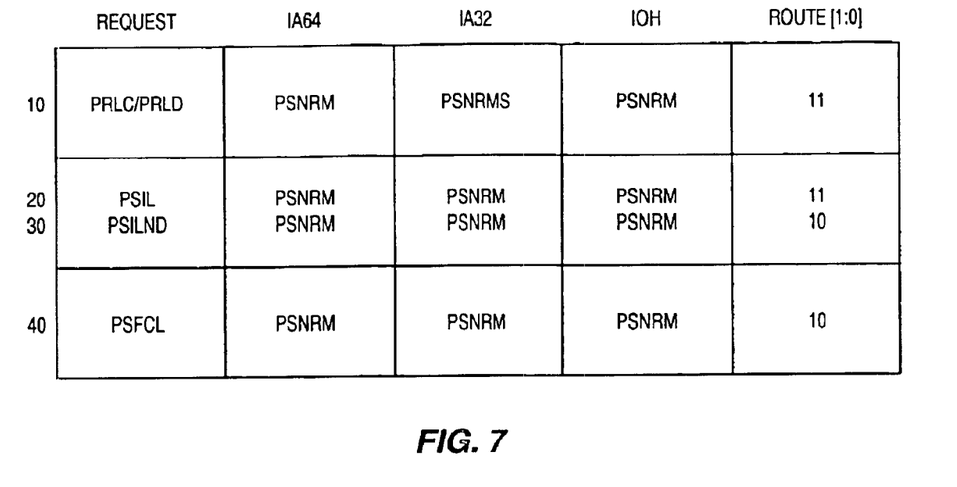
FIG. 7 illustrates several read requests that would result in an implicit write-back.

FIG. 7 demonstrates various incoming requests that generate an implicit write-back according to one embodiment. In this embodiment of the invention, the implicit write-backs are only generated when there is no outgoing request to the same line, therefore all depicted examples assume that the cache line of the responding or dirty node is in a Modified state and that there is no outgoing write request on the cache line when the incoming request is received.

In this embodiment, five types of requests from a requesting node result in an implicit write-back by a responding node containing a copy of Modified Data for a memory location residing on a different node than both the requesting node and the responding node.

The Port Read Line Code/Data (PRLC/PRLD) requests 710 are used to read a cache line. They are used to both read the data on the cache line and snoop the cache line in the caching agent at the responding node. If an IA64 coherence protocol or IOH coherence protocol is implemented at the responding node, a Snoop Response, Modified transitioning to Invalid (PSNRM) is sent to the SPS. Additionally, both the home node and the requesting node are updated with the modified data as indicated by the Route[1:0]="11". In contrast, if the responding node is implementing the IA32 coherence protocol, a Snoop Response, Modified transitioning to Shared (PSNRS) is sent to the SPS.

The Port Snoop Invalidate Line/Port Snoop Invalidate Line No Data (PSIL/PSILND) requests 720 and 730 are used to snoop and invalidate a memory block at a caching node. These two request types differ in their behavior when the memory block found is in the Modified state at the snooped node. For the PSIL request, data is supplied to both the requesting node and the home node while for the PSILND request, only the home node is updated with the modified memory. For PSIL, Route[1:0]="11" and for PSILND, Route[1:0]="10". All three types of coherence protocols, IA64, IA32 and IOH respond the same with a PSNRM (Port Snoop Response, Modified transitioning to Invalid) response as required by the requesting node.

The Port Snoop Flush Cache Line (PSFCL) request 740 is used to flush a memory block from all the caching agents and update the home memory if the block is modified at a caching agent. This request supports flush cache instructions facilitated by various protocols such as the IA64 architectures. Again, the flush requirement invalidates all cache line states after reading the modified memory (PSNRM). Additionally, the data is updated at the home node as indicated by the Route[1:0]="10".

In all of these cases, an implicit write-back is achieved by having the responding node initiate the update without having to wait for a separate write request to be submitted by the requesting node.

Alternative Embodiments

The invention has been described above primarily in terms of Intel's Scalability Port architecture. The Implicit Write-back mechanism is not limited to use in a Distributed Shared Memory environment, nor is it limited to use in conjunction with Intel's Scalability Port. For instance, the present invention may be utilized in existing or new Snoop Based architectures.

The foregoing description has discussed the implicit write-back mechanism as being part of a hardware implemented architecture. It is understood, however, that the invention need not be limited to such a specific application. For example, in certain embodiments the implicit write-back mechanism could be implemented as programmable code to cooperate the activities of multiple memories located in a distributed fashion. Numerous other embodiments that are limited only by the scope and language of the claims are contemplated as would be obvious to someone possessing ordinary skill in the art and having the benefit of this disclosure.

What is claimed is:

1. A method comprising:

receiving a request to read a modified cache line at a responding node of a shared memory multiprocessor architecture from a requesting node of the shared memory multiprocessor architecture; and responding to the request by updating a memory at a home node with data read from the modified cache line, and by providing an answer to the requesting node, wherein the home node is different from the responding node.

2. The method of claim 1, wherein the answer includes a copy of the data read from the modified cache line.

3. The method of claim 1, wherein the response further provides a status of the modified cache line.

4. The method of claim 3, wherein the status indicates one of:

the modified cache line is transitioning from a modified state to an invalid state; and the modified cache line is transitioning from a modified state to a shared state.

5. The method of claim 1, further comprising providing a completion response to the requesting node.

6. The method of claim 3, wherein the status indicates a cache coherence protocol type used by the responding node.

7. A shared memory multiprocessor system comprising:

a plurality of node controllers and a switch coupled to each of the plurality of node controllers configured to:

transmit a read request regarding a modified cache line from a first node controller of the plurality of node controllers through the switch to a second node controller of the plurality of node controllers, wherein the second node controller is distinct from the first node controller; and in response to receiving the read request regarding the modified cache line, the second node controller instructs the switch to update a home memory residing exclusively on a third node controller of the plurality of node controllers.

8. The shared memory multiprocessor system of claim 7 wherein the switch maintains a presence vector.

9. The shared memory multiprocessor system of claim 8 wherein the presence vector maintains a status of a cache line for each participating node controller of the plurality of node controllers.

10. The shared memory multiprocessor system of claim 9 wherein the presence vector indicates if the cache line for each corresponding participating node controller contains a copy of a contents stored in the home memory.

11. A method comprising a responding node initiating an implicit write-back in response to a read request directed to a modified cache line at the responding node.

12. The method of claim 11, wherein the implicit write-back includes information causing the read request to be answered and a home memory to be updated.

13. The method of claim 11, wherein the implicit write-back further includes information identifying a state of the modified cache line.

14. A machine-readable medium having stored thereon data representing sequences of instructions, the sequences of instructions which, when executed by a processor, cause the processor to:

receive a request to read a cache line at a responding node of a shared memory multiprocessor architecture from a requesting node of the shared memory multiprocessor architecture; and respond to the request by updating a memory at a home node with data read from the cache line, and by providing an answer to the requesting node, wherein the home node is different from the responding node.

15. The machine-readable medium of claim 14, wherein the answer includes a copy of the data read from the cache line.

16. The machine-readable medium of claim 14, wherein the response further provides a status of the cache line.

17. The machine-readable medium of claim 16, wherein the status indicates one of:

the cache line is transitioning from a modified state to an invalid state; and the cache line is transitioning from a modified state to a shared state.

18. The machine-readable medium of claim 14, wherein the sequence of instructions further causes the processor to provide a completion response to the requesting node.

19. The machine-readable medium of claim 16, wherein the status indicates a cache coherence protocol type used by the responding node.

* * * * *